United States Patent
Matsuo et al.

(10) Patent No.: US 11,425,279 B2
(45) Date of Patent: Aug. 23, 2022

(54) INFORMATION PROCESSING DEVICE, MEDIUM STORING INFORMATION PROCESSING PROGRAM, AND IMAGE FORMING DEVICE FOR PROTECTING AGAINST FRAUDULENT AUTHENTICATION OF LICENSE FOR APPLICATION

(71) Applicant: FUJIFILM Business Innovation Corp., Tokyo (JP)

(72) Inventors: Kota Matsuo, Kanagawa (JP); Yusuke Izumisawa, Kanagawa (JP); Mami Yokohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 238 days.

(21) Appl. No.: 16/845,078

(22) Filed: Apr. 10, 2020

(65) Prior Publication Data
US 2021/0105382 A1 Apr. 8, 2021

(30) Foreign Application Priority Data
Oct. 4, 2019 (JP) .............................. JP2019-184121

(51) Int. Cl.
*H04N 1/44* (2006.01)
*H04L 29/06* (2006.01)
*G06F 21/60* (2013.01)
*G06F 21/10* (2013.01)
*H04L 9/40* (2022.01)

(52) U.S. Cl.
CPC ........... *H04N 1/4433* (2013.01); *G06F 21/10* (2013.01); *G06F 21/608* (2013.01); *H04L 63/0807* (2013.01); *H04L 63/108* (2013.01)

(58) Field of Classification Search
CPC ..... H04N 1/4433; G06F 21/10; G06F 21/608; G06F 21/105; H04L 63/0807; H04L 63/108; H04L 63/0846; H04L 2463/103
See application file for complete search history.

(56) References Cited

U.S. PATENT DOCUMENTS

| | | | |
|---|---|---|---|
| 7,191,155 B2 | 3/2007 | Maruyama et al. | |
| 2006/0026105 A1* | 2/2006 | Endoh | G06F 21/10 705/59 |
| 2009/0059079 A1* | 3/2009 | Enjuji | H04N 9/643 348/E9.037 |
| 2017/0180387 A1 | 6/2017 | Hayashi et al. | |
| 2019/0068588 A1* | 2/2019 | Inabe | H04L 63/0853 |
| 2020/0036857 A1* | 1/2020 | Kato | H04N 1/34 |

FOREIGN PATENT DOCUMENTS

| | | |
|---|---|---|
| JP | 2003058510 | 2/2003 |
| JP | 2007058609 | 3/2007 |
| JP | 2017111757 | 6/2017 |
| JP | 2017208000 | 11/2017 |

* cited by examiner

*Primary Examiner* — Iriana Cruz
(74) *Attorney, Agent, or Firm* — JCIPRNET

(57) ABSTRACT

An information processing device not connected to a communication line includes a processor configured to measure an accumulated number of execution counts for specific processing repeatedly performed by an application, and perform control so that after the accumulated number of execution counts reaches an allowable number, the application is not started up.

10 Claims, 7 Drawing Sheets

INFORMATION PROCESSING DEVICE, MEDIUM STORING INFORMATION PROCESSING PROGRAM, AND IMAGE FORMING DEVICE FOR PROTECTING AGAINST FRAUDULENT AUTHENTICATION OF LICENSE FOR APPLICATION

CROSS-REFERENCE TO RELATED APPLICATIONS

This application is based on and claims priority under 35 USC 119 from Japanese Patent Application No. 2019-184121 filed on Oct. 4, 2019.

BACKGROUND

(i) Technical Field

The present disclosure relates to an information processing device, a non-transitory computer readable medium storing an information processing program, and an image forming device.

(ii) Related Art

Japanese Unexamined Patent Application Publication No. 2017-208000 discloses an authentication system that performs authentication for utilizing an application on a client connected to a server via a network. The server includes a token issuance unit that generates and transmits an off-line token to the client according to an authentication request from the client; and a token management unit that manages the generated token, the off-line token including, as a token for permitting use of the application, static date/time information indicating an expiration time and dynamic date/time information updated according to execution of authentication, and being used for authentication when the client is in an off-line state. The client includes a token holding unit that holds the off-line token; a use permission unit that, when the current time is on or after the date/time indicated by the dynamic date/time information included in the off-line token and before the expiration time, permits the use of the application, otherwise prohibits the use of the application; and a date/time information update unit that updates the dynamic date/time information to the current time in association with an operation of the use permission unit.

Japanese Unexamined Patent Application Publication No. 2007-58609 discloses a data processing device that can execute a predetermined application, the data processing device including a first built-in clock unit that measures a first system time adjustable; a second built-in clock unit that measures a second system time independently of the first system time measured by the first built-in clock unit; and a management unit that manages execution or termination of the predetermined application based on the second system time obtained from the second built-in clock unit and a period set to the predetermined application.

Japanese Unexamined Patent Application Publication No. 2017-111757 discloses an information processing device including an association information storage that stores association information by which application identification information for identifying each of installed applications is associated with use authorization information on authorization for use of the application; an identification unit that, when receiving a first request from one of the applications, including the application identification information and requesting for the use authorization information, identifies the use authorization information associated with the application identification information included in the first request, based on the association information; and a notification unit that notifies the application making the first request of the use authorization information identified by the identification unit.

Japanese Unexamined Patent Application Publication No. 2003-58510 discloses an information terminal used when a license for an encrypted content is transferred between users, the information terminal including a first storage unit that stores licenses for encrypted content; a second storage unit that stores generation logs for off-line licenses; and a license agent unit that generates an off-line license from a license for an encrypted content, generates a license for an encrypted content from an off-line license and stores the license in the first storage unit, and generates or updates a generation log for each off-line license and stores the generation log in the second storage unit. The information terminal transmits or receives a license for a content by exchanging the off-line license between the license agent units of the information terminal and another information terminal.

SUMMARY

When license authentication of an application installed in an information processing device not connected to a communication line is performed based on whether or not the expiration time for the application is past, a user of the information processing device may continue to use the application with a past expiration time fraudulently by setting back the operating system clock to a time in the past.

Aspects of non-limiting embodiments of the present disclosure relate to an information processing device, and a non-transitory computer readable medium storing an information processing program which are capable of protecting against fraudulent authentication of a license for an installed application even when the information processing device is not connected to a communication line.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device not connected to a communication line, the information processing device including a processor configured to measure an accumulated number of execution counts for specific processing repeatedly performed by an application, and perform control so that after the accumulated number of execution counts reaches an allowable number, the application is not started up.

BRIEF DESCRIPTION OF THE DRAWINGS

Exemplary embodiment of the present disclosure will be described in detail based on the following figures, wherein.

DETAILED DESCRIPTION

Hereinafter, the present exemplary embodiment will be described with reference to the drawings. It is to be noted that the same symbol is labeled with the same components and the same processing through the entire drawing, and a redundant description is omitted.

Figure 1:
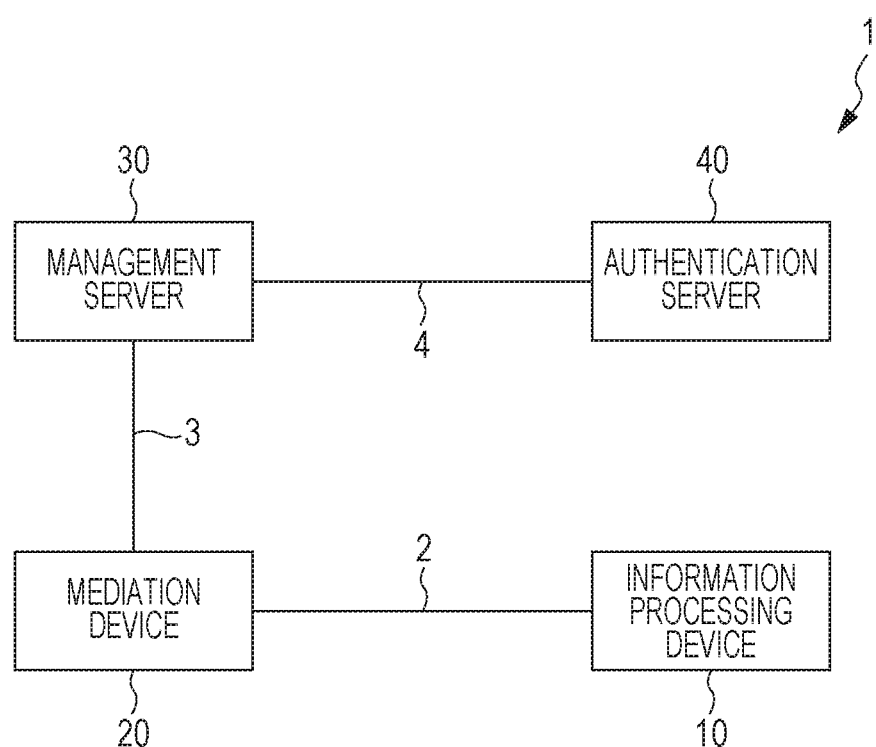
FIG. 1 is a diagram illustrating a system configuration example of an information processing system.

FIG. 1 is a diagram illustrating a system configuration example of an information processing system 1 according to the present exemplary embodiment, and the information processing system 1 includes an information processing device 10, a mediation device 20, a management server 30, and an authentication server 40.

The information processing device 10 and the mediation device 20 are devices operated by a user who utilizes the information processing device 10, for instance. The management server 30 and the authentication server 40 are devices operated by an administrator who manages the information processing device 10, and provides some services to users via the information processing device 10, for instance.

The respective installation sites for the information processing device 10, the mediation device 20, the management server 30, and the authentication server 40 are not restricted. However, for instance, the information processing device 10 and the mediation device 20 are installed in the same building, and the management server 30 and the authentication server 40 are installed in a building different from the building where the information processing device 10 and the mediation device 20 are installed, specifically, installed in a data center or the like. In addition, the mediation device 20 and the management server 30 at a remote site are connected by a public line which is an example of a communication line, such as the internet, to which an unspecified number of devices are connected.

The information processing device 10 is a device that provides a service to a user according to an instruction thereof. The type of the information processing device 10 is not restricted as long as the device provides services to a user. For instance, the information processing device 10 is an image forming device that provides an image forming service by which an image specified by a user is formed on a recording medium such as a sheet of paper.

In order to execute a service provided by the information processing device 10, an application that defines the processing corresponding to the service is necessary. As described later, execution of the application is permitted upon receiving license authentication from the management server 30. Specifically, execution of the application is permitted during a period before an expiration time indicated by a license received from the management server 30. On and after the expiration time, even when a user attempts to execute the application, control is performed so that the application is not started up. Thus, in order to utilize the application after the expiration time for the application, the information processing device 10 requests the management server 30 to issue a new license with an updated expiration time.

Meanwhile, in order to prevent information leakage and falsification of data by unauthorized access from the outside, the information processing device 10 is not connected to a public line 3 to which an unspecified number of devices are connected, but is connected to an internal line 2 to which specific devices, such as devices managed by an organization to which a user belongs, are connected. Specifically, the internal line 2 is a closed communication line in a specific organization, such as a local area network (LAN) or an intranet, and connection to the communication line from any device outside the organization is not permitted. Thus, when the information processing device 10 transmits and receives information to and from the management server 30, the information is transmitted and received to and from the management server 30 through the mediation device 20.

The mediation device 20 is a device that mediates transmission and reception of information between the information processing device 10 and the management server 30. When the mediation device 20 mediates transmission and reception of information between the information processing device 10 and the management server 30, an operation of the mediation device 20 by a user is necessary. Specifically, when a user transmits information of the information processing device 10 to the management server 30, the user operates the mediation device 20 so that an authentication screen for the management server 30 is displayed, and inputs registered authentication information to the authentication screen, thereby notifying the management server 30 that the input is for a connection request from a user of the information processing device 10 managed by the management server 30. After authentication of the user is completed by the management server 30, the user selects information to be transmitted to the management server 30 from the information transmitted from the information processing device 10 to the mediation device 20 through the internal line 2, and the user presses a transmission button displayed on a transmission screen to transmit the selected information to the management server 30. On the other hand, when a user passes the information received from the management server 30 to the information processing device 10, the user operates the mediation device 20 to select information to be passed to the information processing device 10, then presses a transfer button displayed on a receiving screen to transfer the selected information to the information processing device 10 through the internal line 2.

Hereinafter, an example will be described, in which the information processing device 10 is connected to the mediation device 20 via the internal line 2. However, the information processing device 10 may be utilized in a single state (referred to as a "stand-alone" state) where the information processing device 10 is not connected to the internal line 2 and any communication line. In this case, a user may manually transfer information between the information processing device 10 and the mediation device 20 using a portable semiconductor memory, such as a Universal Serial Bus (USB) memory or a memory card.

Although the information processing device 10 is connected to the internal line 2, when the information processing device 10 transmits and receives information in this manner to and from a device connected to the public line 3 to which an unspecified number of devices are connected, the information processing device 10 which needs an operation of a user on the mediation device 20 is referred to as the "information processing device 10 not connected to a communication line". Also, a state not connected to a communication line may be referred to as an "off-line state".

In the example of the information processing system 1 illustrated in FIG. 1, the information processing system 1 includes only one set of combination of the information processing device 10 and the mediation device 20. However, multiple combinations of the information processing device 10 and the mediation device 20 are installed at the sites where users utilize application, and respective mediation devices 20 are connected to the management server 30 via the public line 3.

The management server 30 manages the license for each application executed by the information processing device 10 as well as processing results of specific processing (hereinafter referred to as "specific processing") repeatedly performed by the application during a period in which the application is executed by the information processing device 10.

When the information processing device 10 is an image forming device, the information processing device 10 repeatedly performs color evaluation processing during a period in which an application for forming an image is executed, the color evaluation processing being configured to evaluate how far the hue, brightness, and chroma of an image formed on a recording medium differ from the specified hue, brightness, and chroma, respectively. The management server 30 manages color evaluation results which are the results of the color evaluation processing in the information processing device 10, and transmits color correction information to the information processing device 10, the color correction information for performing color correction so that the color of an image formed on a recording medium by the information processing device 10 becomes closer to a specified color. In other words, in the present exemplary embodiment, the color evaluation processing is an example of the specific processing. It is to be noted that color correction may be performed by either the management server 30 or the information processing device 10.

The authentication server 40 is connected to the management server 30, for instance, via an internal line 4 which is a closed communication line in an organization to which an administrator who manages the management server 30 belongs. Authentication information for users is registered in the authentication server 40. The authentication server 40 outputs an authentication result which indicates whether or not authentication information of which a user notifies the authentication server 40 is the authentication information for the user who utilizes the information processing device 10 managed by the management server 30.

Figure 2:
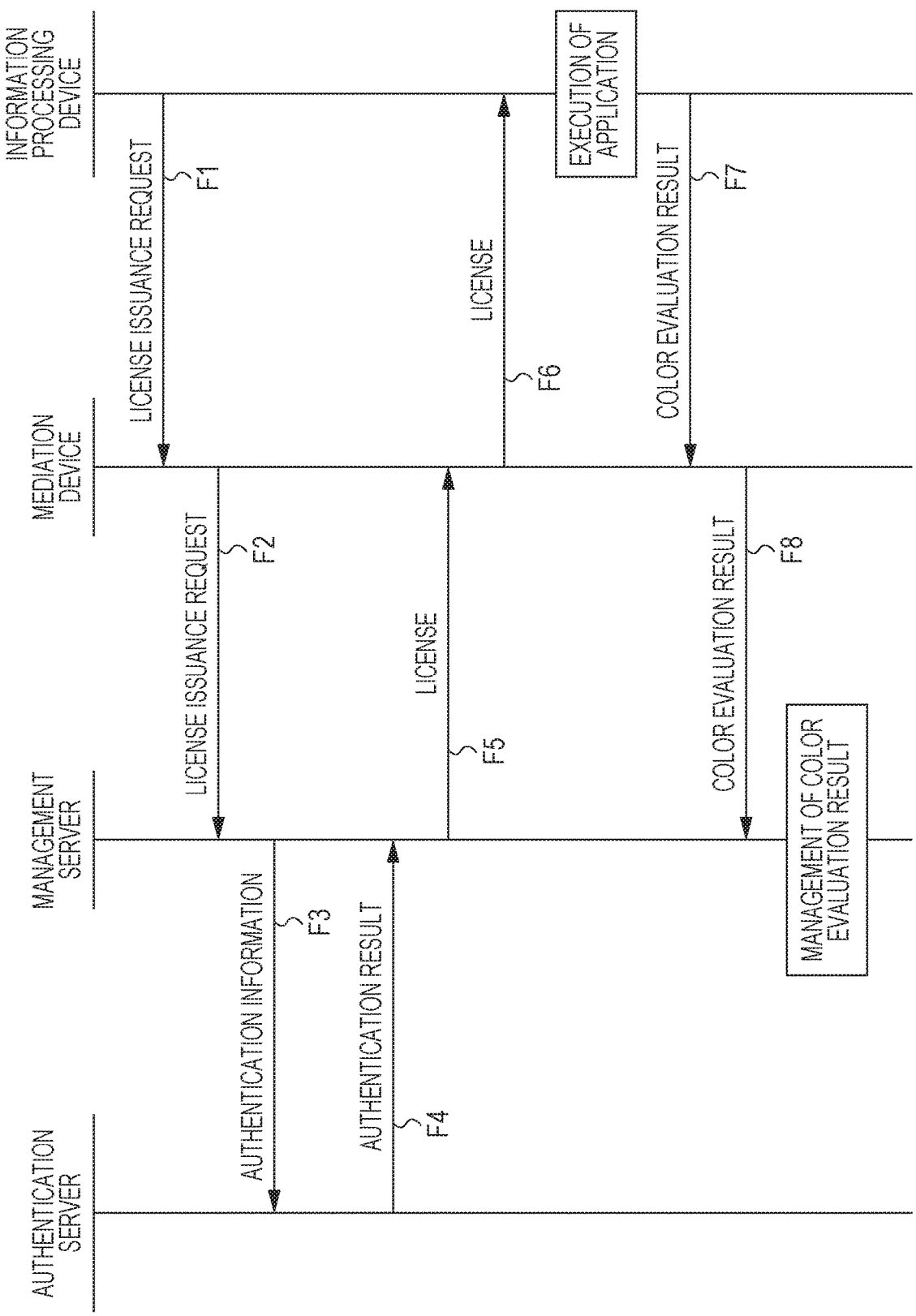
FIG. 2 is a sequence diagram illustrating an example of a flow of information in the information processing system.

FIG. 2 is a sequence diagram illustrating an example of fundamental transfer of information performed when the information processing device 10 utilizes an application.

The information processing device 10 requests the management server 30 for a license in order to utilize an application. Thus, the information processing device 10 transmits a license issuance request to the mediation device 20 through the internal line 2 (see the sequence F1 of FIG. 2).

Upon receiving the license issuance request from the information processing device 10, the mediation device 20 transfers the authentication information for a user and the license issuance request to the management server 30 according to an operation of the user (see the sequence F2 of FIG. 2).

Upon receiving the authentication information, the management server 30 transfers the received authentication information to the authentication server 40 through the internal line 4 (see the sequence F3 of FIG. 2).

The authentication server 40 transmits an authentication result to the management server 30 through the internal line 4, the authentication result being for the authentication information received from the management server 30 (see the sequence F4 of FIG. 2).

Upon receiving the authentication result, when the management server 30 confirms using the authentication result that the license issuance request received from the mediation device 20 is from an information processing device 10 managed by the management server 30, the management server 30 generates a license which sets an expiration time for the application and an allowable number for the specific processing performed by the information processing device 10 during a period before the expiration time, and transmits the generated license to the mediation device 20 through the public line 3 (see the sequence F5 of FIG. 2).

Upon receiving the license, the mediation device 20 transfers the received license to the information processing device 10 according to an operation of the user (see the sequence F6 of FIG. 2).

Upon receiving the license, the information processing device 10 sets the expiration time for the application and the allowable number for the specific processing included in the license. The setting of the expiration time for the application and the allowable number for the specific processing to the information processing device 10 is called "license registration", and execution of the application in the information processing device 10 is permitted by performing the license registration.

Figure 3:
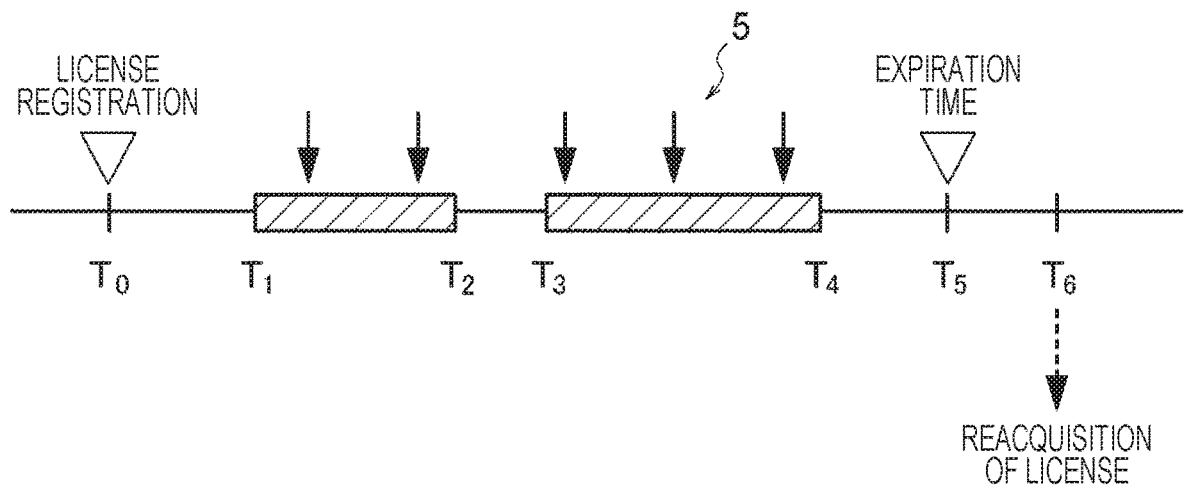
FIG. 3 is a chart illustrating an execution example of an application along a temporal sequence in an information processing device.

FIG. 3 is a chart illustrating an execution example of an application along a temporal sequence in the information processing device 10. In the example of FIG. 3, license registration is performed at time $T_0$, and the expiration time for the application is set at $T_5$. It is illustrated that after the application is executed during the period from time $T_0$ to time $T_2$, the application is executed again during the period from time $T_3$ to time $T_4$.

The information processing device 10 obtains the time (hereinafter referred to as the "system time") of a clock managed by the OS of the information processing device 10, for instance, during execution of the application, and stores the most recent system time among obtained system times as the last use date/time of the application. Although the timing of obtaining the last use date/time is not restricted, in the present exemplary embodiment, the information processing device 10 obtains the system time, for instance, at the time of start-up and end of the application, and defines the last use date/time of the application as the system time obtained most recently. It is to be noted that the system time is configured by date/time information including not only information on time, minute, and second, but also information on year, month, and date.

Since it is determined whether or not the expiration time for the application is past at the time of start-up, when a user attempts to start up the application again at time $T_6$ after the expiration time for the application, the expiration time is determined to be past, and control is performed so that the application is not started up. In this case, the application can be used subsequently by making a license issuance request again by the information processing device 10 and obtaining a license with an extended expiration time.

In FIG. 3, each arrow 5 indicates an execution timing for the color evaluation processing. When a license is registered in the information processing device 10, the information processing device 10 resets an accumulated number of execution counts for the color evaluation processing to "0", and measures the accumulated number of execution counts for the color evaluation processing since the license is registered. The information processing device 10 transmits the measured accumulated number of execution counts for the color evaluation processing to the management server 30 along with a color evaluation result in synchronization with the timing of transmission of the color evaluation result to the management server 30.

It is to be noted that a specific method of using the last use date/time of an application and the accumulated number of execution counts for the color evaluation processing will be described in detail later.

As described above, since the color evaluation processing is repeatedly performed during a period in which the information processing device 10 executes the application, the information processing device 10 transmits a color evaluation result, which is a result of the color evaluation processing, to the mediation device 20 through the internal line 2 (see the sequence F7 of FIG. 2).

Upon receiving the color evaluation result from the information processing device 10, the mediation device 20 transfers the color evaluation result to the management server 30 according to an operation of the user (see the sequence F8 of FIG. 2).

Upon receiving the color evaluation result, the management server 30 manages the received color evaluation result. Hereinafter the management server 30 transmits color correction information to the information processing device 10 through the mediation device 20 at a predetermined timing, the color correction information being set using the managed color evaluation result. The information processing device 10 corrects the color of an image formed on a recording medium in accordance with the received color correction information. Consequently, for instance, when the same image is formed by another information processing device 10, an image with the same hue, brightness, and chroma is formed on a recording medium. Here, color correction may be performed by either the management server 30 or the information processing device 10.

Figure 4:
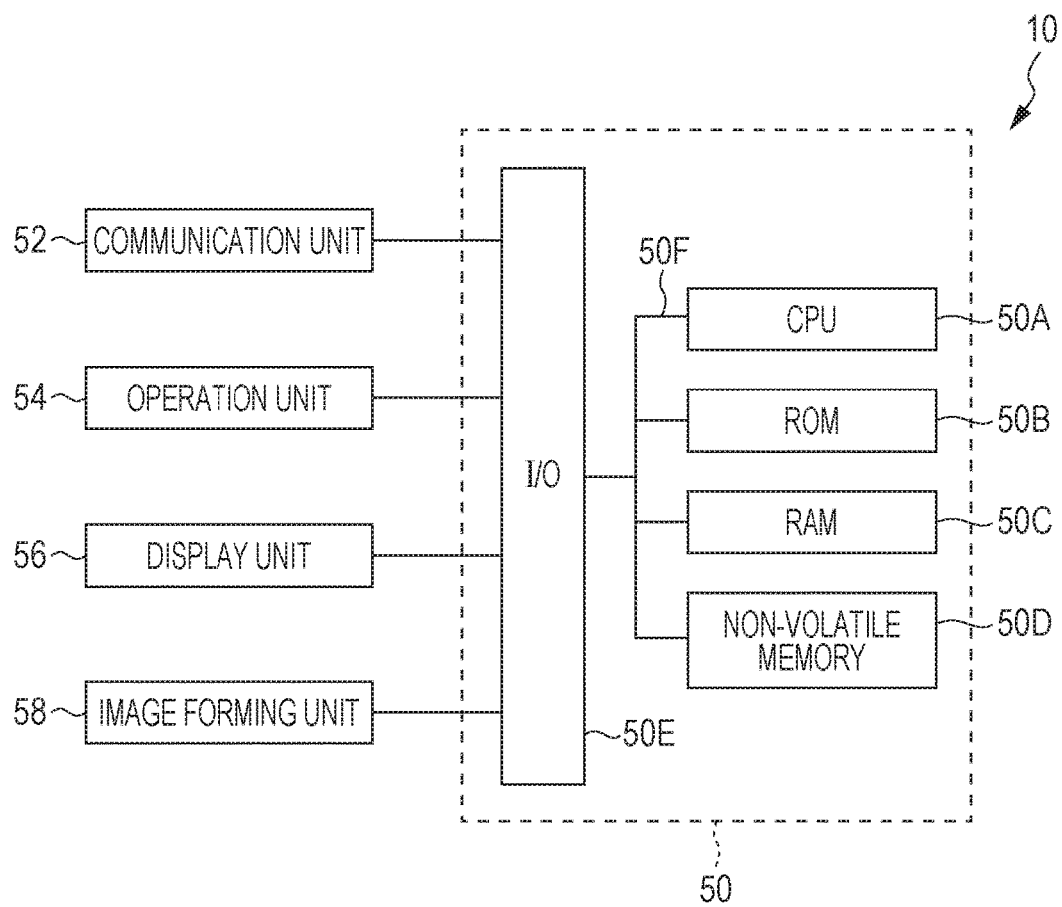
FIG. 4 is a diagram illustrating a primary configuration example of an electrical system in the information processing device.

FIG. 4 is a diagram illustrating a primary configuration example of an electrical system in the information processing device 10. The information processing device 10 is implemented using, for instance, a computer 50.

The computer 50 includes: a central processing unit (CPU) 50A which is an example of a processor that implements the functions associated with the information processing device 10; a read only memory (ROM) 50B that stores an information processing program for causing the computer 50 to function as the information processing device 10; a random access memory (RAM) 50C that is used as a temporary work area for the CPU 50A; a non-volatile memory 50D; and an input/output interface (I/O) 50E. The CPU 50A, the ROM 50B, the RAM 50C, the non-volatile memory 50D, and the I/O 50E are connected to each other via a bus 50F.

The non-volatile memory 50D is an example of a storage device that holds stored information even when electric power supplied to the non-volatile memory 50D is cut off. For instance, a semiconductor memory is used, but a hard disk may be used. The non-volatile memory 50D is not necessarily built in the computer 50, and may be a portable memory medium, such as a USB memory or a memory card, detachably attached to the computer 50.

The I/O 50E is connected to, for instance, a communication unit 52, an operation unit 54, a display unit 56, and an image forming unit 58.

The communication unit 52 is connected to the internal line 2, and includes a communication protocol for performing data communication with the mediation device 20.

The operation unit 54 is a unit that receives instructions from a user, and notifies the CPU 50A of the instructions. For instance, a button, a touch panel, a keyboard, and a mouse are used. When instructions are given by voice, a microphone may be used as the operation unit 54.

The display unit 56 is a device that displays information processed by the CPU 50A. For instance, a liquid-crystal display and an organic electro luminescence (EL) display are used.

The image forming unit 58 is a unit that forms an image on a recording medium in accordance with the instructions of the CPU 50A which executes an application, the image being specified by a user. Any image forming method may be used by the image forming unit 58, and for instance, an ページ: 20 electrophotographic system or an inkjet system is used.

Figure 5:
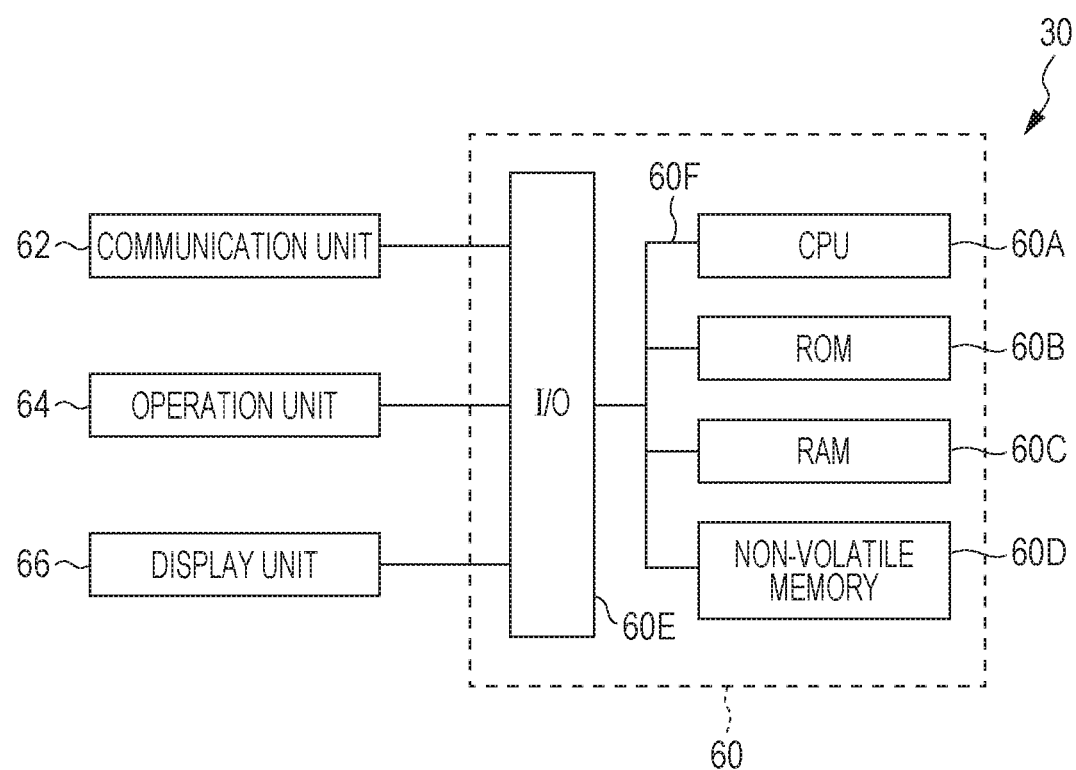
FIG. 5 is a diagram illustrating a primary configuration example of an electrical system in a management server.

FIG. 5 is a diagram illustrating a primary configuration example of an electrical system in the management server 30. The management server 30 is implemented using, for instance, a computer 60.

The computer 60 includes: a central processing unit 60A which is an example of a processor that implements the functions associated with the management server 30; a ROM 60B that stores a management program for causing the computer 60 to function as the management server 30; a RAM 60C that is used as a temporary work area for the CPU 60A; a non-volatile memory 60D; and an I/O 60E. The CPU 60A, the ROM 60B, the RAM 60C, the non-volatile memory 60D, and the I/O 60E are connected to each other via a bus 60F.

The I/O 60E is connected to, for instance, a communication unit 62, an operation unit 64, and a display unit 66.

The communication unit 62 is connected to the public line 3 and the internal line 4, and includes a communication protocol for performing data communication with the mediation device 20 and the authentication server 40.

The operation unit 64 is a unit that receives instructions from an administrator, and notifies the CPU 60A of the instructions. For instance, a button, a touch panel, a keyboard, and a mouse are used. When instructions are given by voice, a microphone may be used as the operation unit 64.

The display unit 66 is a device that displays information processed by the CPU 60A. For instance, a liquid-crystal display and an organic EL display are used.

It is to be noted that a primary configuration example of an electrical system in the mediation device 20 and the authentication server 40 has the same configuration as that of the primary configuration example of the electrical system in the management server 30 illustrated in FIG. 3, thus, a description is omitted.

Next, the operation of the information processing device 10 will be described.

Figure 6:
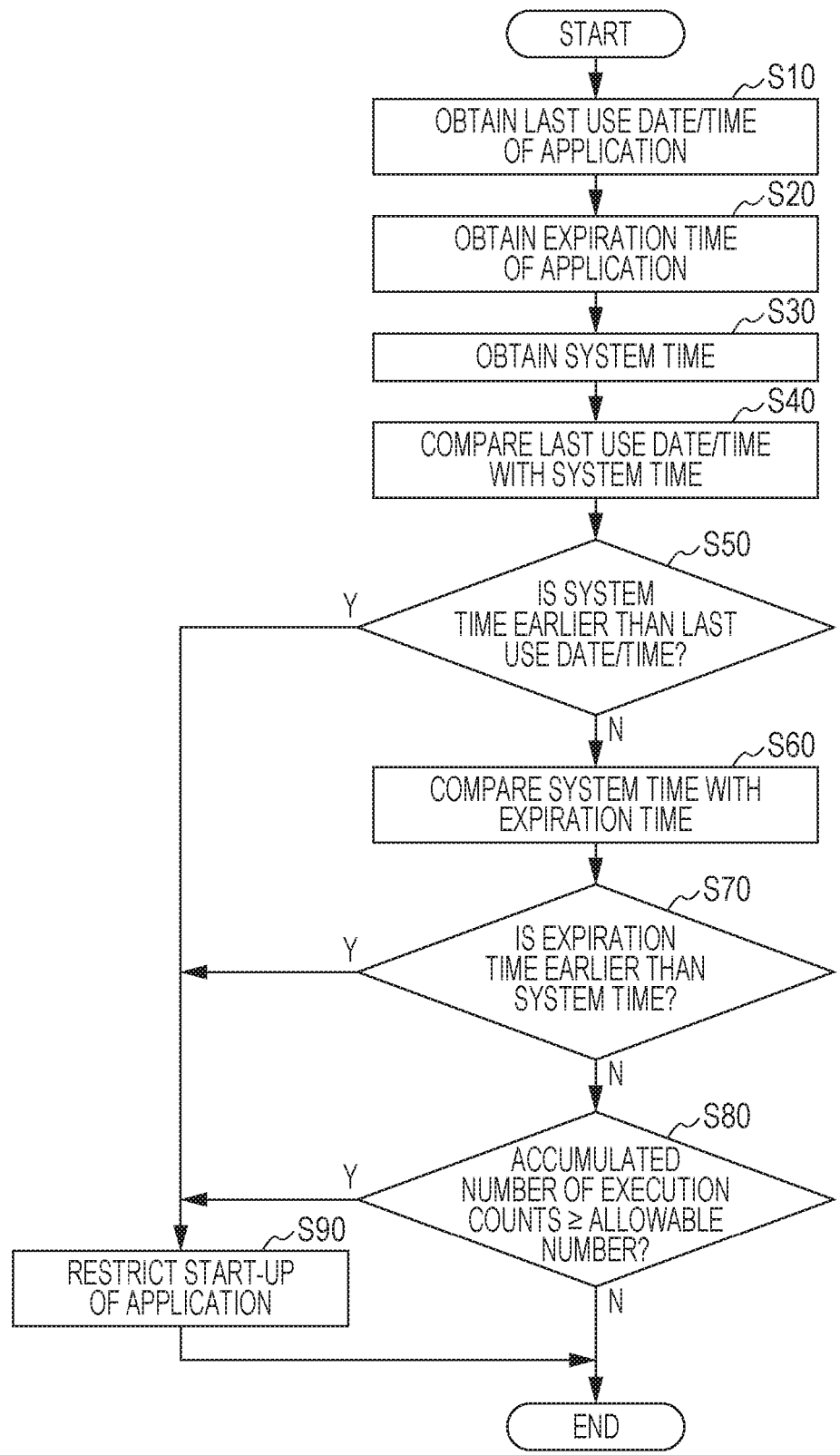
FIG. 6 is a flowchart illustrating an example of a flow of control processing in the information processing device.

FIG. 6 is a flowchart illustrating an example of a flow of control processing performed by the CPU 50A of the information processing device 10. An information processing program that defines the control processing is pre-stored, for instance, in the ROM 50B of the information processing device 10. The CPU 50A of the information processing device 10 reads the information processing program stored in the ROM 50B, and executes the control processing. The CPU 50A may execute the control processing illustrated in FIG. 6 at any timing, and as an example, the CPU 50A executes the control processing subsequently after the color evaluation processing is executed.

It is to be noted that the non-volatile memory 50D of the information processing device 10 pre-stores applications, for each of which a license has been obtained from the management server 30, and also stores the last use date/time and the accumulated number of execution counts for the color evaluation processing of each application, and the expiration time and the allowable number for the color evaluation processing of the application included in each obtained license.

In step S10, the CPU 50A obtains the last use date/time of the application from the non-volatile memory 50D.

In step S20, the CPU 50A obtains the expiration time for the application from the non-volatile memory 50D.

In step S30, the CPU 50A obtains the system time managed by the OS. To obtain the system time, for instance, the Application Programming Interface (API) is utilized, which is prepared in advance for obtaining the system time from the OS. It is to be noted that the CPU 50A may control the communication unit 52 and obtain time information from a time server (not illustrated) connected to, for instance, the internal line 2, and may utilize the time information as the system time.

In step S40, the CPU 50A compares the last use date/time of the application obtained in step S10 with the system time obtained in step S30.

In step S50, the CPU 50A determines whether or not the system time is earlier than the last use date/time of the application.

In the OS, a system time setting screen is prepared in advance. The system time setting screen allows the system time to be set to a specified date/time. Thus, some users may plan to continue to use an application fraudulently even after the expiration time for the application is past by setting back the system time to a time earlier than the actual date/time so that the system time does not reach the expiration time for the application. In particular, when a license for an application is issued for a charge, fraudulent use is more likely to occur, as compared with when a license for an application is issued free of charge. Hereinafter, setting the system time to a time earlier than the actual date/time is referred to as "setting back the system time".

Figure 7:
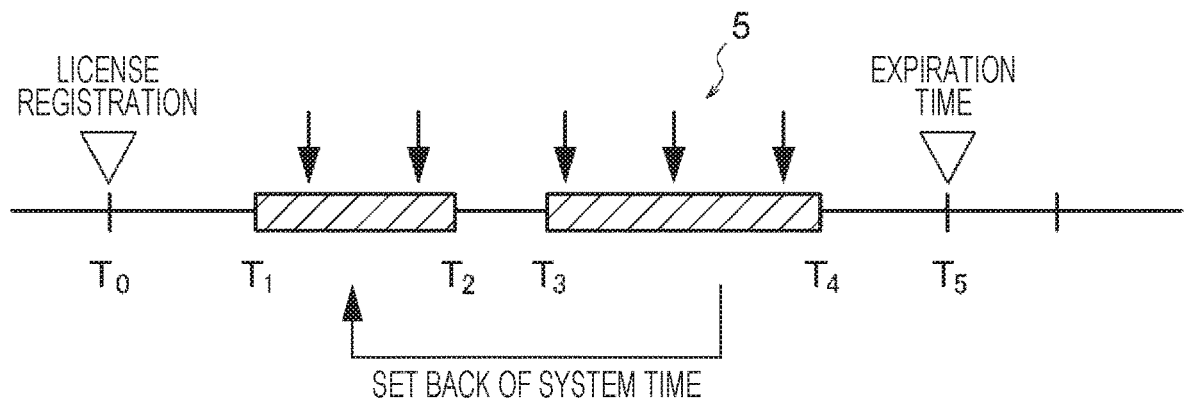
FIG. 7 is a chart illustrating an execution example of an application along a temporal sequence when a user sets back a system time.

FIG. 7 is a chart illustrating an execution example of an application along a temporal sequence when a user sets back the system time. FIG. 7 illustrates an example in which the system time is set back to a time earlier than time $T_4$ at which a user quits the application, and is set to a time between time $T_1$ and $T_2$. As already described, the last use date/time of the application is updated at the time of start-up and end of the application, therefore, in this case, the system time is determined to be earlier than the last use date/time of the application.

When the system time is determined to be earlier than the last use date/time of the application in this manner, the flow proceeds to step S90.

In step S90, the CPU 50A performs control so that even when a user attempts to start up the application, the application is not started up until a new license is issued from the management server 30. The CPU 50A then completes the control processing illustrated in FIG. 6.

On the other hand, when the system time is determined to be at or later than the last use date/time of the application, the flow proceeds to step S60.

In step S60, this time, the CPU 50A compares the expiration time for the application obtained in step S20 with the system time obtained in step S30.

In step S70, the CPU 50A determines whether or not the expiration time for the application is earlier than the system time. When the expiration time for the application is earlier than the system time, the expiration time for the application is past, and the flow proceeds to step S90. As already described, in step S90, the CPU 50A performs control so that even when a user attempts to start up the application, the application is not started up, then completes the control processing illustrated in FIG. 6.

On the other hand, when the expiration time for the application is determined to be later than the system time, the flow proceeds to step S80.

In step S80, the CPU 50A determines whether or not the measured accumulated number of execution counts for the color evaluation processing reaches the allowable number, in other words, determines whether or not the measured accumulated number of execution counts for the color evaluation processing is greater than or equal to the allowable number.

As illustrated in FIG. 7, if a user sets back the system time to a time earlier than the last use date/time of the application, control is performed so that the application is not started up due to the determination processing in step S50. However, as illustrated in FIG. 8, for instance, when a user continues to set back the system time to a time at or later than the last use date/time of the application and earlier than the expiration time for the application before the user quits the application, the user's such fraudulent activity by setting back the system time is not detected by the determination processing in step S50.

Figure 9:
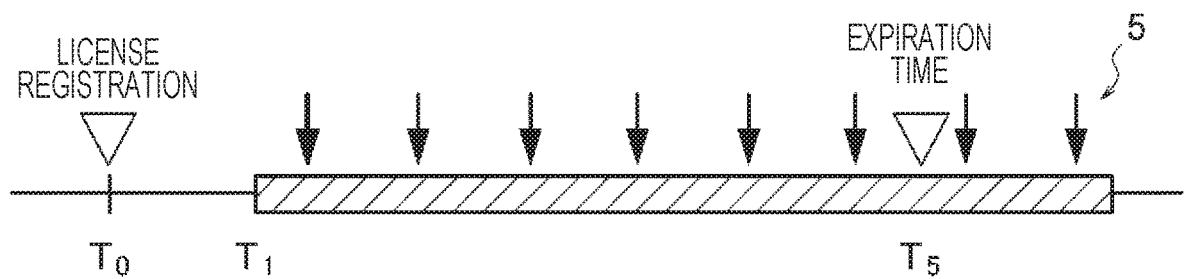
FIG. 9 is a chart illustrating an execution example of an application along a temporal sequence when a user utilizes the application in such a manner that the application is continued to be executed.

As already described, since it is determined whether or not the expiration time is past at the time of start-up of the application, as illustrated in FIG. 9, when a user starts up the application and continues to use the application without quitting the application even after the expiration time, the application is continued to be used as long as the application is not terminated by the user.

Figure 8:
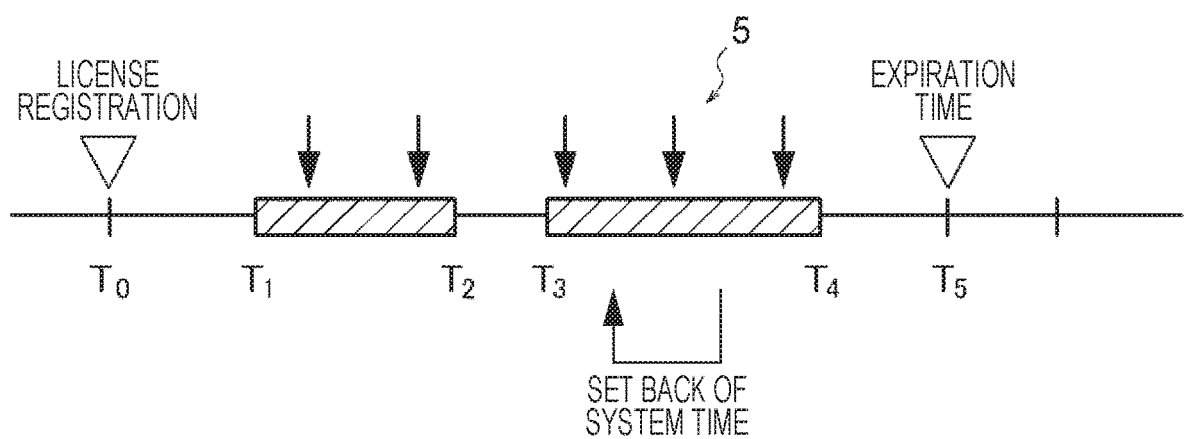
FIG. 8 is a chart illustrating another execution example of an application along a temporal sequence when a user sets back a system time.

However, since the color evaluation processing is repeatedly performed in the information processing device 10 during a period in which the application is executed, even when the situation as illustrated in FIGS. 8 and 9 occurs, continuous use of the application after the expiration time is prevented by performing control so that the application is not started up at the time when the accumulated number of execution counts for the color evaluation processing reaches the allowable number.

Particularly, when an estimated value of the accumulated number of execution counts for the color evaluation processing performed by the application until the expiration time for the application is set as the allowable number for the color evaluation processing, control can be performed so that the application is not started up according to the expiration time for the application, without comparing the system time with the expiration time for the application.

Thus, when the measured accumulated number of execution counts for the color evaluation processing reaches the allowable number, the flow proceeds to step S90, and in step S90, the CPU 50A performs control so that even when the user attempts to start up the application, the application is not started up, then completes the control processing illustrated in FIG. 6.

On the other hand, in the determination processing in step S80, when the measured accumulated number of execution counts for the color evaluation processing does not reach the allowable number, use of the application is within a reasonable period corresponding to the expiration time for the application. Thus, start-up of the application is not restricted, and the control processing illustrated in FIG. 6 is completed.

Next, the operation of the management server 30 that issues a license for the application to the information processing device 10 will be described.

Figure 10:
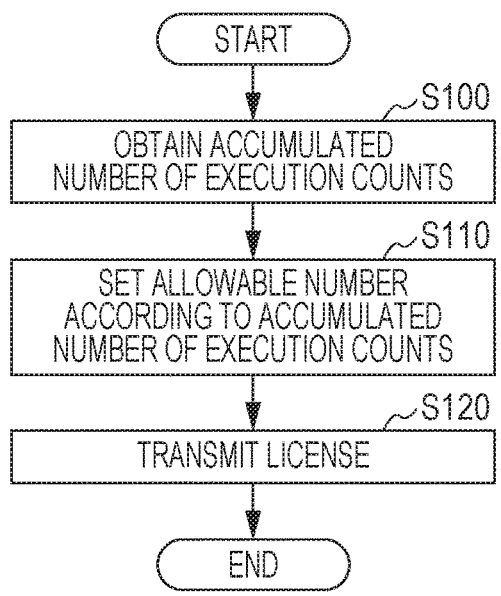
FIG. 10 is a flowchart illustrating an example of a flow of management processing in the management server.

FIG. 10 is a flowchart illustrating an example of a flow of management processing executed by the CPU 60A of the management server 30 when a license issuance request is received from the information processing device 10 through the mediation device 20. A management program that defines the management processing is pre-stored, for instance, in the ROM 60B of the management server 30. The CPU 60A of the management server 30 reads the management program stored in the ROM 60B, and executes the management processing.

It is assumed that the non-volatile memory 60D of the management server 30 stores the accumulated number of execution counts for the color evaluation processing sent from the information processing device 10. The accumulated number of execution counts for the color evaluation processing is transmitted to the management server 30, for instance, along with a color evaluation result to be transmitted to the management server 30 by the information processing device 10. In this manner, the load of the information processing device 10 as well as the amounts of traffic on the internal line 2 and the public line 3 are reduced, as compared with when the information processing device 10 transmits the color evaluation result and the accumulated number of execution counts to the management server 30 separately.

In step S100, the CPU 60A obtains from the non-volatile memory 60D the most recent accumulated number of execution counts for the color evaluation processing in the information processing device 10.

In step S110, the CPU 60A sets a number as the allowable number for the color evaluation processing to be granted for a new license, according to the use situation of the information processing device 10, specifically, the accumulated number of execution counts for the color evaluation processing obtained in step S100, the number being small as much as possible and such that the accumulated number of execution counts for the color evaluation processing does not reach the number before the expiration time for the application.

When a license having the same expiration time as that in the previous time is issued, it is estimated that the accumulated number of execution counts for the color evaluation processing performed before the expiration time for the application is substantially the same as the accumulated number of execution counts for the color evaluation processing performed before the expiration time for the application in the previous time, provided that the information processing device 10 is the same.

Thus, the CPU 60A only have to set a new allowable number to the accumulated number of execution counts for the color evaluation processing obtained in step S100.

When the accumulated number of execution counts for the color evaluation processing in the past used for setting an accumulated number of execution counts for the color evaluation processing is increased each time a license issuance request is received, the information processing device 10 may calculate, for instance, an average increase rate of the accumulated number of execution counts for the color evaluation processing, and may set a number as a new allowable number for the color evaluation processing, the number being equal to the allowable number granted for the license issued in the previous time increased by the average increase rate. Conversely, when the accumulated number of execution counts for the color evaluation processing in the past used for setting an accumulated number of execution counts for the color evaluation processing is decreased each time a license issuance request is received, the information processing device 10 may calculate, for instance, an average decrease rate of the accumulated number of execution counts for the color evaluation processing, and may set a number as a new allowable number for the color evaluation processing, the number being equal to the allowable number granted for the license issued in the previous time decreased by the average decrease rate.

In addition, a moving average of the accumulated number of execution counts for the color evaluation processing in the past used for setting an accumulated number of execution counts for the color evaluation processing may be set as a new allowable number for the color evaluation processing. An allowable number calculated by inputting the accumulated number of execution counts for the color evaluation processing obtained in step S100 to an estimation model may be set as a new allowable number for the color evaluation processing, the estimation model having machine-learned the correspondence between the accumulated number of execution counts and the allowable number for the color evaluation processing.

The CPU 60A sets an allowable number based on the accumulated number of execution counts for the color evaluation processing obtained in step S100 in accordance with a method of setting the accumulated number of execution counts for the color evaluation processing, the method being specified in advance by an administrator, for instance.

When the received license issuance request is the one made by the information processing device 10 for the first time, there is neither accumulated number of execution counts for the color evaluation processing set for the information processing device 10 nor accumulated number of execution counts for the color evaluation processing performed by the information processing device 10 before the expiration time.

However, in order to facilitate a user to utilize an application, an administrator who provides the application to the information processing device 10 may offer a trial period of the application before a formal contract with the user for the application is made.

Thus, when the CPU 60A receives a license issuance request made by the information processing device 10 for the first time, the CPU 60A may set an allowable number for the color evaluation processing according to the accumulated number of execution counts for the color evaluation processing in the trial period of the application.

When a user installs an application in the information processing device 10 without experiencing a trial period, an allowable number for the color evaluation processing may be set in the information processing device 10 which has transmitted a license issuance request for the first time, using the allowable number for the color evaluation processing set in other information processing devices 10 managed by the management server 30, for instance. Specifically, an amount of statistics obtained by statistically processing the allowable number for the color evaluation processing set in other information processing devices 10, such as an average amount of the allowable number for the color evaluation processing set in other information processing devices 10 may be set as the allowable number for the color evaluation processing in the information processing device 10 which has transmitted a license issuance request for the first time.

In step S120, the CPU 60A assigns the allowable number for the color evaluation processing set in step S110, and a new expiration time for the application to a license, and transmits the license through the mediation device 20 to the information processing device 10 which is the license issuance request source.

The CPU 60A may transmit the allowable number for the color evaluation processing and the expiration time for the application separately to the information processing device 10. However, when the allowable number for the color evaluation processing and the expiration time for the application are assigned to a license and transmitted together, the load of the management server 30 as well as the amounts of traffic on the internal line 2 and the public line 3 are reduced, as compared with when the allowable number for the color evaluation processing and the expiration time for the application are separately transmitted.

The management processing illustrated in FIG. 10 is completed now.

It is to be noted that when a license for an application is issued for a charge, the CPU 60A only have to perform charge processing for the user of the information processing device 10 by the management processing illustrated in FIG. 10.

In this manner, with the information processing system 1 according to the present exemplary embodiment, the information processing device 10 measures an accumulated number of execution counts for specific processing repeatedly performed by an application during execution of the application, and when and after the accumulated number of execution counts for the specific processing reaches the allowable number, performs control so that the application is not started up. In other words, it is determined whether or not the expiration time for the application is past by not using the system time changeable by a user, but using the accumulated number of execution counts for the specific processing, which is an example of a value unchangeable by a user.

Thus, in the information processing device 10 not connected to a communication line, even when a user fraudulently changes the system time of the information processing device 10 so that the expiration time for an application is not reached, or continues to use an application without quitting the application, the occurrence of fraudulent activity related to license authentication of an application installed in the information processing device 10, such as continuous use of the application even after the expiration time for the application, is reduced.

Thus, in the information processing device 10 as illustrated in FIG. 1, for instance, in a situation where a user of the information processing device 10 signs a license contract for using an application with an administrator, and cancels the license contract after several days, the occurrence of fraudulent activity, such as setting the information processing device 10 with the installed application provided by the administrator in a stand-alone state and continuing to use the application, is reduced.

Although an example has been described above, in which the management server 30 manages the license for each application, even when the information processing device 10 manages the license in a stand-alone state without cooperation with any device, what has been described in the present exemplary embodiment is applied.

In this case, it is sufficient that the information processing device 10 be provided with the function of the management server 30, and the management processing illustrated in FIG. 10 be executed in the information processing program of the information processing device 10. In the information processing device 10, for instance, the non-volatile memory 50D stores an accumulated number of execution counts for the color evaluation processing and a color evaluation result, and when a new license needs to be issued, the CPU 50A only have to set an allowable number for the color evaluation processing granted for the new license according to the most recent accumulated number of execution counts for the color evaluation processing stored in the non-volatile memory 50D. When an allowable number for the color evaluation processing is set for the first time after the trial period of the application, the CPU 50A only have to set an allowable number for the color evaluation processing according to the accumulated number of execution counts for the color evaluation processing in the trial period of the application.

In the present exemplary embodiment, the operation of the information processing device 10 has been described by way of example of the image forming device. However, the information processing device 10 may be any type of device as long as the device is not connected to a communication line, and executes an application for which an expiration time is set and requires a new license for subsequent use after the expiration time.

For instance, some games are each granted based on a license for which an expiration time is set, and installed in an information device, such as a tablet terminal, a smartphone, and a game machine, for play. In many cases, such an information device has a communication function of connecting to the public line 3, and runs a game while obtaining data through the public line 3. In an environment connectable to the public line 3, the information device obtains a license from a server of a game providing company, the server monitors the expiration time for the game, and performs control so that each game with a past expiration time is not started up in the information device.

However, in the case of a game which utilizes positional information of a global positioning system (GPS) or the like, even at a location not connectable to the public line 3, such as deep in the mountains, when positional information can be obtained from an artificial satellite, a user can utilize the game by pre-storing necessary data for the game in a built-in storage of the information device. On the other hand, since the information device is not connected to the public line 3, the server of a game providing company is unable to monitor the expiration time for the game, thus it is difficult to disable start-up of a game with a past expiration time.

Thus, the example of the information processing device 10 according to the present exemplary embodiment is applied to such an information device, the accumulated number of execution counts for specific processing repeatedly performed by a game is measured during execution of the game, and the accumulated number of execution counts for the specific processing is compared with the allowable number, then, start-up of the game is prevented after the accumulated number of execution counts for the specific processing reaches the allowable number.

As the specific processing in a game, for instance, obtaining an item to be used in the game, gate passing by a character operated, and expedition of the enemy may be used.

Although an authenticated application with a formal license is installed and used in an information device connected to the public line 3, the maintenance period of the OS of the information device may expire during the use. In such a situation, even when a vulnerability of the OS is found, the vulnerability is not fixed, thus when the information device is left connected to the public line 3, a security problem may occur in the information device. Thus, a user may disconnect the information device from the public line 3 and continue to use the information device in a stand-alone state.

Since the information device is disconnected from the public line 3 which is connected to the server that manages the license for the application, in such a situation also, various applications installed in the information device may be utilized with a past expiration time. Thus, the control processing illustrated in FIG. 6 is applied to the information device, and start-up of the application is thereby prevented after the accumulated number of execution counts for the specific processing in the application reaches the allowable number.

It is to be noted that when the application is a document generation application, the specific processing may be saving processing of a generated document, and when the application is an image fabrication application, the specific processing may be fabrication processing for fabricating an image somehow. In addition, when the application is a character conversion application that converts voice to character, the specific processing may be conversion processing to character.

Although the present disclosure has been described above using the exemplary embodiment, the present disclosure is not limited to the scope of the described exemplary embodiment. Various changes and improvements may be made on the exemplary embodiment in a range not departing from the spirit of the present disclosure, and the changed or improved exemplary embodiment is also included in the technical scope of the present disclosure. For instance, the order of processing may be changed in a range not departing from the spirit of the present disclosure.

In the present exemplary embodiment, as an example, a mode in which the control processing and the management processing are implemented by software has been described. However, processing equivalent to the flowchart illustrated in FIGS. 6 and 10 may be implemented in an application specific integrated circuit (ASIC), a field programmable gate array (FPGA), or a programmable logic device (PLD), and the processing may be performed by hardware. In this case, the processing can be sped up, as compared with the control processing and the management processing are each implemented by software.

In this manner, at least one of the CPU 50A and the CPU 60A may be replaced by a dedicated processor focused on specific processing, such as an ASIC, an FPGA, a PLD, a graphics processing unit (GPU), and a floating point unit (FPU).

In addition to the mode in which the operations of the CPU 50A and the CPU 60A in the exemplary embodiment are implemented by one CPU 50A and one CPU 60A, respectively, the operations of the CPU 50A and the CPU 60A may be implemented by multiple CPUs 50A and multiple CPUs 60A, respectively. Furthermore, the operation of the CPU 50A and the CPU 60A in the exemplary embodiment may be implemented by the CPUs 50A of multiple computers 50 in collaboration which are located physically apart from each other and the CPUs 60A of multiple computers 60 in collaboration which are located physically apart from each other, respectively.

In the aforementioned exemplary embodiment, a mode has been described, in which the information processing program is installed in the ROM 50B, and the management program is installed in the ROM 60B. However, without being limited to this, the programs according to the present disclosure may be provided in a form recorded in a computer-readable recording medium. For instance, the programs according to the present disclosure may be provided in a form recorded in an optical disc, such as a compact disc (CD)-ROM, or a digital versatile disc (DVD)-ROM. Alternatively, the programs according to the present disclosure may be provided in a form recorded in a semiconductor memory.

In addition, the information processing device 10 may obtain the information processing program according to the present disclosure from another device connected to the internal line 2 or another device connected to the public line 3 through the mediation device 20. Alternatively, the management server 30 may obtain the management program according to the present disclosure from another device connected to the internal line 4 or another device connected to the public line 3.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device not connected to a communication line, the information processing device comprising
   a processor configured to
      measure an accumulated number of execution counts for specific processing repeatedly performed by an application, and
      perform control so that after the accumulated number of execution counts reaches an allowable number, the application is not started up,
   wherein the information processing device is an image forming device that forms an image on a recording medium, and the processor performs color evaluation of an evaluation image formed on the recording medium, as the specific processing.

2. The information processing device according to claim 1, wherein the processor sets the allowable number according to a use situation of the application.

3. The information processing device according to claim 2, wherein the processor sets the allowable number according to a use situation in a trial period of the application.

4. The information processing device according to claim 2, wherein when the use situation of the application after the allowable number is set is different from a use frequency of the application before the allowable number is set, the processor updates the allowable number according to the use situation of the application after the allowable number is set.

5. The information processing device according to claim 3, wherein when the use situation of the application after the allowable number is set is different from a use frequency of the application before the allowable number is set, the processor updates the allowable number according to the use situation of the application after the allowable number is set.

6. The information processing device according to claim 1, wherein the processor compares the accumulated number of execution counts with the allowable number specified by a server through a mediation device which needs an operation of a user for transmitting and receiving information, and after the accumulated number of execution counts reaches the allowable number, the processor performs control so that the application is not started up.

7. The information processing device according to claim 6, wherein the processor notifies the server of information indicating the accumulated number of execution counts through the mediation device, and after the accumulated number of execution counts reaches the allowable number having a value updated by the server according to the accumulated number of execution counts transmitted by the processor, the processor performs control so that the application is not started up.

8. The information processing device according to claim 7, wherein when the accumulated number of execution counts of which the server is notified is decreased from the accumulated number of execution counts in past used by the server for setting the allowable number, the processor compares the accumulated number of execution counts with the allowable number updated to have a value decreased from the allowable number before the update, and controls start-up of the application.

9. A non-transitory computer readable medium storing an information processing program causing a computer not connected to a communication line to execute a process comprising:
  measuring an accumulated number of execution counts for specific processing repeatedly performed by an application; and
  performing control so that after the accumulated number of execution counts reaches an allowable number, the application is not started up,
  wherein the computer is an image forming device that forms an image on a recording medium, and
  the computer performs color evaluation of an evaluation image formed on the recording medium, as the specific processing.

10. An image forming device not connected to a communication line, the image forming device comprising
  a processor configured to
    measure an accumulated number of execution counts for color evaluation processing repeatedly performed by an application, and
    perform control so that after the accumulated number of execution counts reaches an allowable number, the application is not started up.

* * * * *